United States Patent
Yu et al.

(10) Patent No.: US 12,229,446 B2
(45) Date of Patent: Feb. 18, 2025

(54) PERFORMANT WRITE PENDING DATA DESTAGING

(71) Applicant: Dell Products L.P., Round Rock, TX (US)

(72) Inventors: Rong Yu, West Roxbury, MA (US); Lixin Pang, Needham, MA (US); Jiahui Wang, Framingham, MA (US); Mohammed Asher, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 109 days.

(21) Appl. No.: 18/143,380

(22) Filed: May 4, 2023

(65) Prior Publication Data

US 2024/0370203 A1 Nov. 7, 2024

(51) Int. Cl.
*G06F 3/06* (2006.01)
(52) U.S. Cl.
CPC .......... *G06F 3/0659* (2013.01); *G06F 3/0611* (2013.01); *G06F 3/067* (2013.01)
(58) Field of Classification Search
CPC ...... G06F 3/0659; G06F 3/067; G06F 3/0683; G06F 3/0611; G06F 3/0619; G06F 12/0868; G06F 2212/222

USPC .................................................. 711/154, 103
See application file for complete search history.

(56) References Cited

U.S. PATENT DOCUMENTS

| | | | |
|---|---|---|---|
| 9,767,021 B1* | 9/2017 | Wu ....................... | G06F 12/126 |
| 2019/0188058 A1* | 6/2019 | Martin ................ | G06F 11/3433 |
| 2019/0332299 A1* | 10/2019 | Armangau .......... | G06F 16/1727 |
| 2020/0210291 A1* | 7/2020 | Yamamoto .......... | G06F 11/1096 |
| 2022/0091976 A1* | 3/2022 | Soukhman .......... | G06F 12/0822 |
| 2024/0069773 A1* | 2/2024 | In .......................... | G06F 3/0619 |

* cited by examiner

*Primary Examiner* — Hashem Farrokh
(74) *Attorney, Agent, or Firm* — Krishnendu Gupta; Nikhil Patel

(57) ABSTRACT

One or more aspects of the present disclosure relate to performant destaging of write pending (WP) data to disk. In embodiments, an input/output (IO) workload is received at a storage array. Additionally, the IO workload can include an IO request with a random write request. Further, a write destage context for write-pending (WP) data corresponding to the random write request can be generated by a data services engine of the storage array. In addition, using the write destage context, a disk adapter (DA), at a backend of the storage array, is enabled to destage write-pending (WP) data without reading from a target write location of the random write request on a storage device on the storage array.

16 Claims, 4 Drawing Sheets

PERFORMANT WRITE PENDING DATA DESTAGING

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to performant destaging of write pending (WP) data to disk. In embodiments, an input/output (IO) workload is received at a storage array. Additionally, the IO workload can include an IO request with a random write request. Further, a write destage context for write-pending (WP) data corresponding to the random write request can be generated by a data services engine of the storage array. In addition, using the write destage context, a disk adapter (DA), at a backend of the storage array, is enabled to destage write-pending (WP) data without reading from a target write location of the random write request on a storage device on the storage array.

In embodiments, a read request can be issued to a backend service engine to read several sectors from the storage device via the data services engine. For example, the sectors can correspond to the IO request's target write location and the number corresponding to data alignment and XOR (exclusively-or) write requirements.

In embodiments, gaps in the storage device sectors corresponding to the WP data can be identified via the data services engine.

In embodiments, the WP data to boundaries corresponding to the sectors can be aligned via the data services engine. In addition, the identified gaps can be filled via the data services engine.

In embodiments, previously stored data corresponding to the target write location of the at least one IO request can be cached in the memory sectors. Additionally, the memory can be shared between the data services engine and the DA.

In embodiments, a write destage context corresponding to the WP data can be generated by the data services engine. In addition, write destage metadata can be included in the write destage context. For example, the write destage metadata can include information the DA uses to destage the WP data to the storage device. Further, the write destage context can be cached in the memory by the data services engine.

In embodiments, cache slots of the memory storing the previously stored data and the write destage context can be locked by the data services engine.

In embodiments, a write destage request can be sent to the DA by the data services engine. Further, the write destage request can include a pointer to the locked cache slots.

In embodiments, the DA can access the previously stored data, and the write destage context using the pointer. The WP data can be destaged to the storage device by the DA using the previously stored data and the write destage context.

In embodiments, the locked cache slots can be unlocked in response to the data services engine receiving a write completion response from the DA.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In addition, a business can provide its employees with applications that generate and write data to the storage array. For example, an application can issue an IO request with a random write request. Further, the IO request can result in the storage array caching a partial write pending (WP) track. Because partial WP tracks are inherently off-sector aligned, the storage array must pre-read currently stored data (e.g., old data) from a corresponding physical location in a storage device to align the cached partial WP track to sector boundaries.

Once the data services engine aligns the partial WP track, a disk adapter (DA) of the storage array destages it to its corresponding physical location in the storage device. However, current naïve destaging techniques require the DA to perform a redundant read of the old data from the storage device. Consequently, the current naïve destaging techniques reduce the write performance of the storage array. In contrast, embodiments of the present disclosure enable a DA to destage WP data without performing a redundant read of the old data from the storage device described in greater detail herein.

Figure 1:
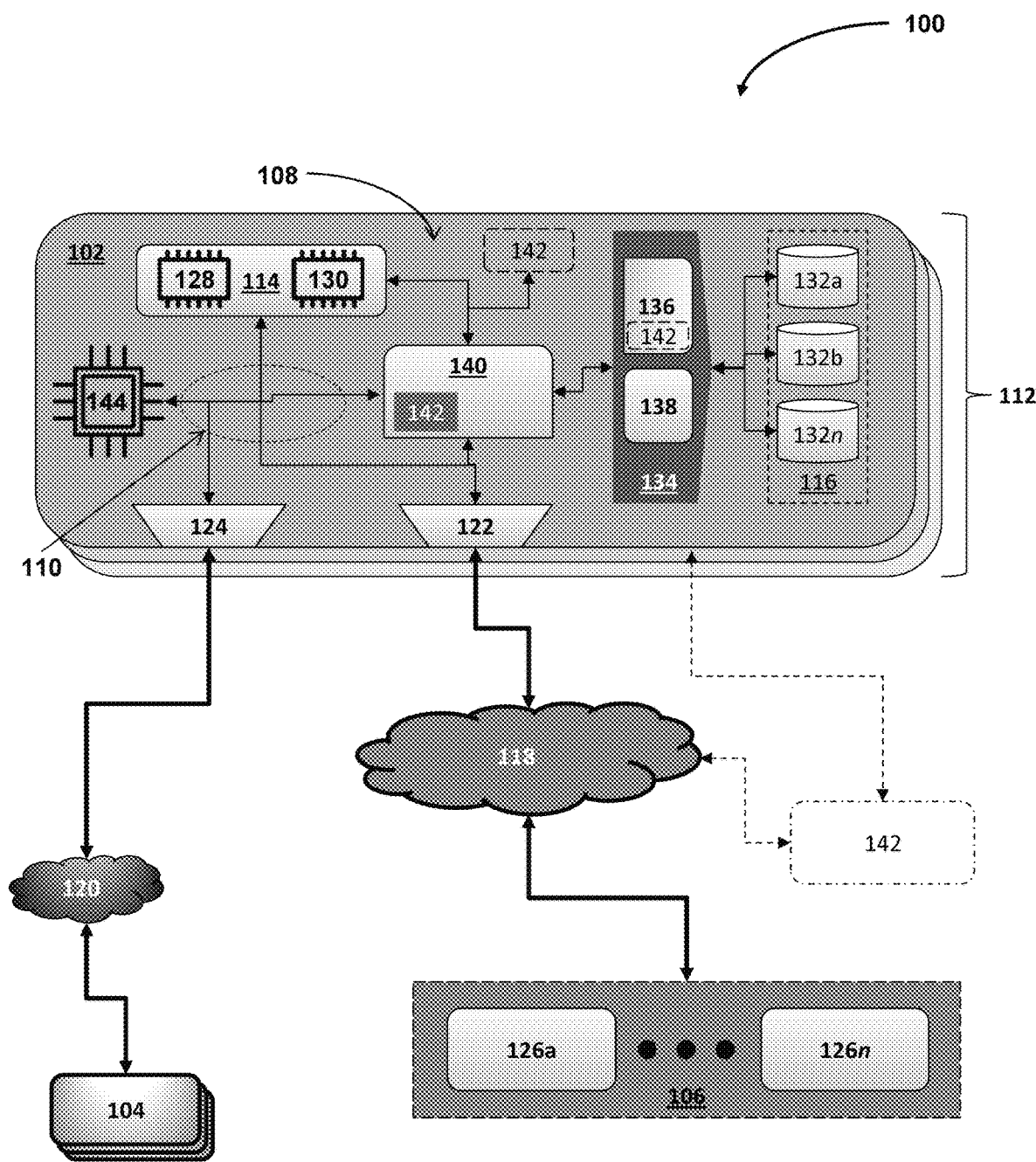
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein. In embodiments, the controller 142 or one or more of its components can reside in the EDS 140 or the DA 136.

Figure 2:
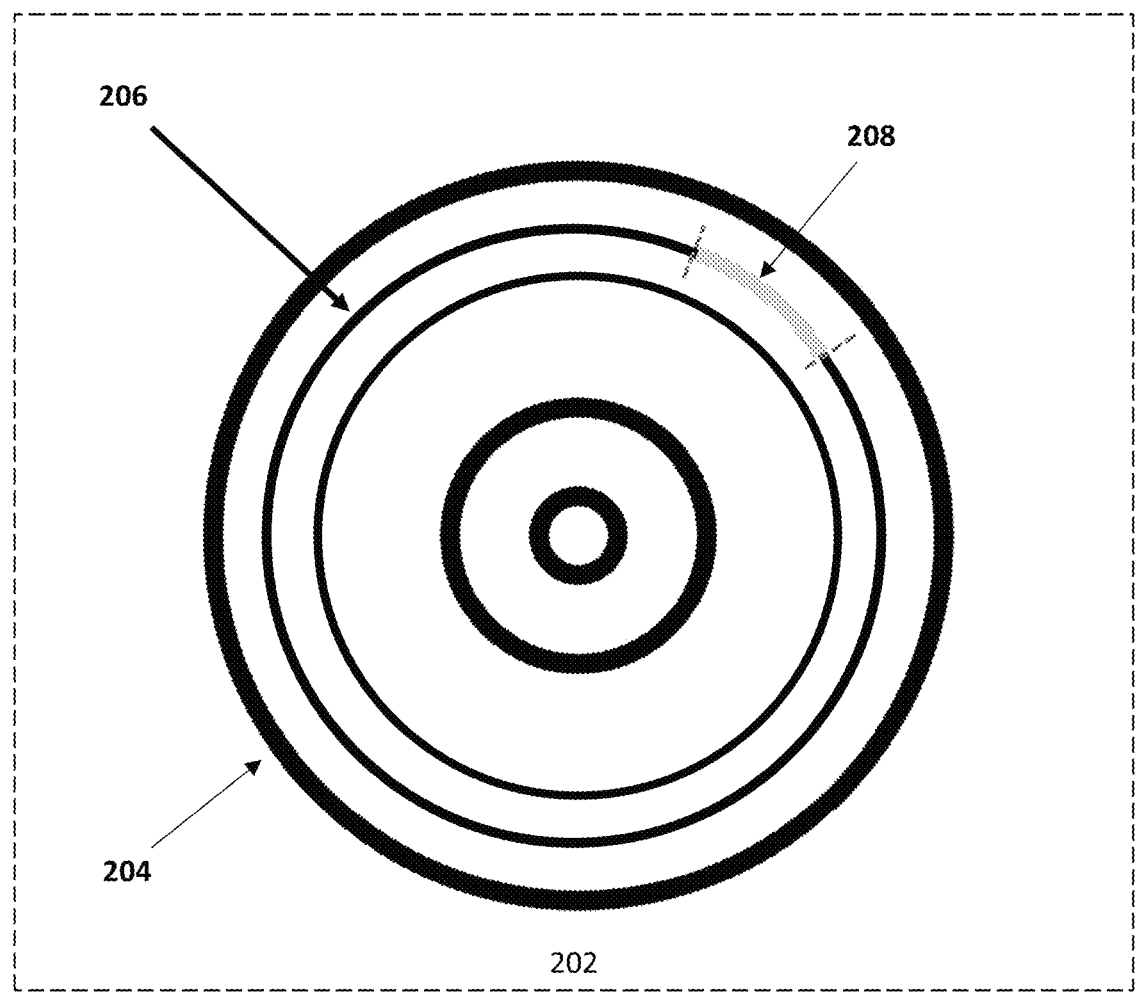
FIG. 2 is a cross-sectional view of a storage device in accordance with embodiments of the present disclosure.

Regarding FIG. 2, the storage array 102 can provide a host, e.g., client machine 126a of FIG. 1, with a logical device (e.g., virtual or thin device (TDEV)). The logical device can represent or virtualize zero or more physical address spaces from, e.g., the persistent storage 116 of FIG.

1. For example, the persistent storage 116 can include an HDD 202 with stacks of cylinders 204. Like a vinyl record's grooves, each cylinder 204 can include one or more tracks 206. Further, each track 206 can include several sectors (e.g., track slices or portions) 208. Additionally, each sector 208 can include a set of physical address blocks.

In embodiments, a data services engine (e.g., the EDS 140 of FIG. 1) can establish a logical block address (LBA) corresponding to each physical address block. Accordingly, a continuous set of LBAs can form a logical sector corresponding to a physical sector (e.g., sector 208) of a storage device 132a-n. Further, the data services engine can group several logical sectors to establish a logical track. Thus, a logical track can include physical address blocks from several storage devices 132a-n. Additionally, each logical track can include a unique identifier (ID), e.g., a track ID (TID). Thus, the data services engine can establish a logical device with a unique device ID by logically grouping one or more logical tracks using their respective TIDs. Furthermore, the data services engine can logically group a logical device's tracks to establish one or more extents with unique extent IDs.

Figure 3:
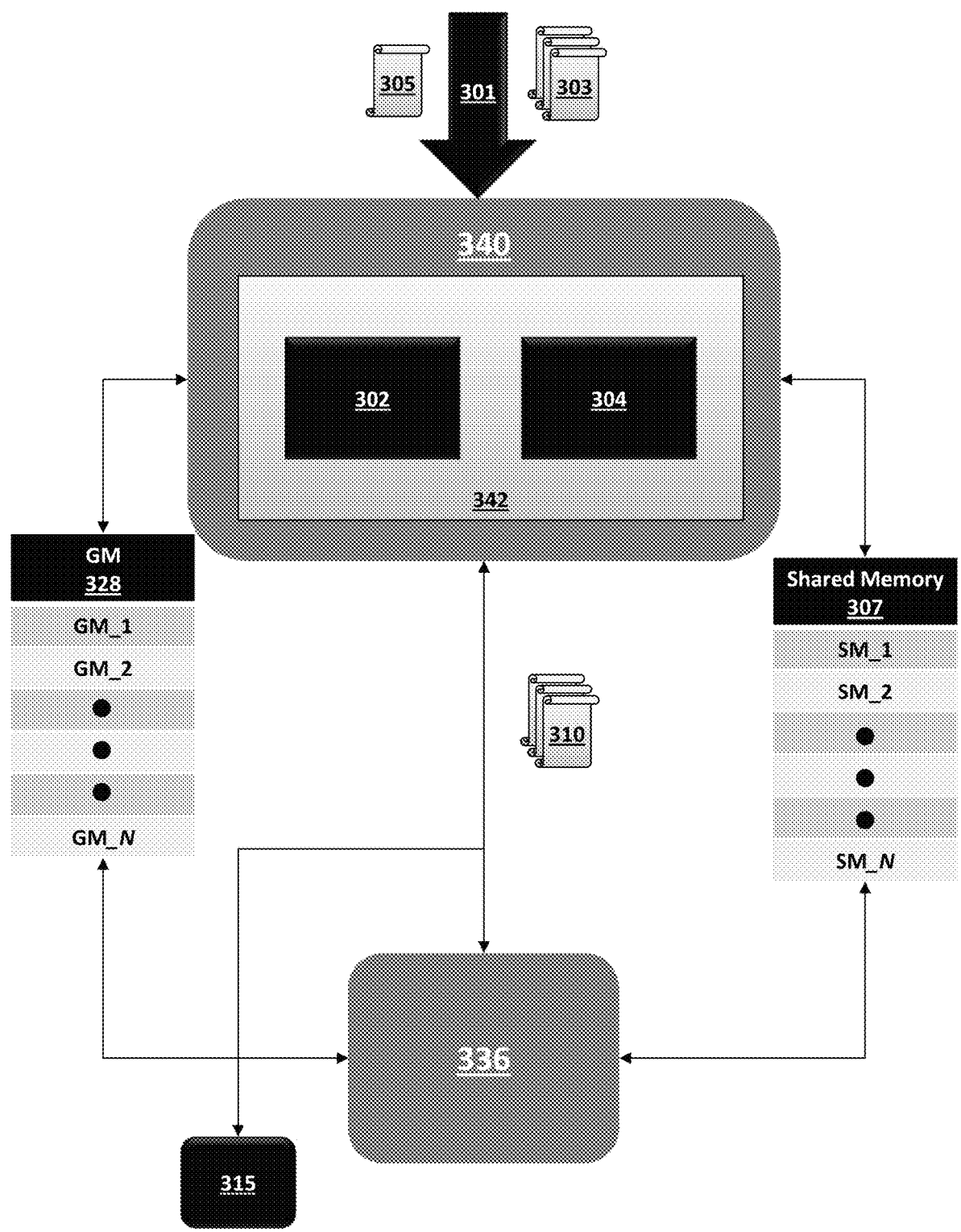
FIG. 3 is a block diagram of a controller in accordance with embodiments of the present disclosure.

Regarding FIG. 3, a storage array (e.g., the storage array 102 if FIG. 1) can receive an input/output (IO) workload 301. In embodiments, the IO workload 301 can include one or more sequential IO write requests 303 or one or more random write requests 305. For example, a sequential IO write request 303 can include a set of write requests, sequentially targeting several virtual device's logical segments (e.g., extents, tracks, sectors, or LBAs). Specifically, the sequential write requests can target the set of logical segments in an order based on their corresponding unique IDs. In contrast, the random write requests 308 can randomly target one or more of the logical segments.

In embodiments, the storage array 102 can include a data services engine 340, which is substantially similar to the EDS 140 of FIG. 1. Generally, the data services engine 340 can precache data corresponding to the sequential IO write requests 303 in, e.g., a global memory (GM) 328, which is substantially similar to the GM 128 of FIG. 1. Specifically, the data services engine 340 can precache the data in one or more of the GM's cache slots GM_1-N. Generally, the precached data corresponding to sequential IO write requests 303 are sector aligned. Thus, the storage array 102 can generally destage the precached data to persistent storage (e.g., the persistent storage 116 of FIG. 1) without sector aligning or gap-filling the precached data. However, data corresponding to random IO write requests are generally neither precached nor sector aligned.

In embodiments, the data services engine 340 can include logic, circuitry, and hardware that perform one or more data management services. For example, the data services engine 340 can include a data services controller 342, which is substantially similar to the controller 142 of FIG. 1. Additionally, the data services controller 342 can include an IO processor 302 that processes the IO workload 301 and its corresponding IO requests. For example, the IO processor 302 can cache write-pending (WP) data corresponding to a random IO write request 305 in, e.g., one or more cache slots GM_1-N of GM 328. In embodiments, the size of the cache slots GM_1-N can correspond to the size of a virtual device's logical segments targeted by the random IO write request 305.

Further, the WP data can correspond to a partial sector of a virtual device (e.g., partial WP data). The partial WP data can also fill a portion of a sector's LBAs. Suppose, for example, a sector includes sixteen (16) LBAs, then the filled portion of the sector's LBAs is less than sixteen LBAs. Thus, the partial WP data includes gaps in its target sector of the virtual device. Furthermore, the filled portion can correspond to random LBAs of the sector, resulting in an unaligned sector.

In embodiments, the data services controller 342 can include a WP data manager 304 that performs one or more destaging services. For example, the WP data manager 304 can obtain data (e.g., "old data") corresponding to the random IO write request currently stored in the persistent storage 116. Specifically, the WP data manager 304 can obtain the target logical segments of a virtual device from the random IO write request's metadata. Using a look-up table (LUT) stored in, e.g., the GM 1128 of FIG. 1, the WP data manager 304 can identify the physical address spaces in the persistent storage 116 corresponding to the logical segments. Further, the WP data manager 304 can issue a request to a backend service engine 315 coupled to the persistent storage 116 for the old data.

Additionally, the request can include instructions for obtaining a number of additional physical segments to satisfy the WP data manager's data alignment and XOR (exclusively-or) write requirements. For instance, the physical segments can correspond to the virtual device's logical segments (e.g., extents, tracks, sectors, or LBAs). Further, the WP data manager 304 can cache the old data and the number of additional physical segments in a shared memory 307.

In addition, the WP data manager 304 can align the partial WP data to the sector's boundaries using the old data and the number of additional physical segments. After aligning the partial WP data, the WP data manager 304 can determine if any gaps remain in the sector. If the WP data manager 304 detects remaining gaps, the WP data manager 304 can fill the empty LBAs corresponding to the gaps. Specifically, the WP data manager 304 can fill the gaps with dummy data.

The WP data manager 304 can also generate a write destage context corresponding to the WP data. The write destage context can include write destage metadata corresponding to required destaging information. For example, the metadata can include old data's shared memory location, the random IO write request's metadata, and other required destaging information. The WP data manager 304 can also cache the write destage context in the shared memory 307.

In embodiments, the WP data manager 304 can send a write destage request 310 to a disk adapter (DA) 336, substantially similar to the DA 136 of FIG. 1. The write destage request 310 can include one or more pointers to the cache slots SM_1-N, caching the old data and write destage context. Furthermore, the write destage request 310 can provide the DA 336 with instructions for destaging the WP data to the persistent storage 116. Further, the WP data manager 304 can lock the cache slots SM_1-N, caching the old data and write destage context.

In response to the write destage request 310, the DA 336 can destage the WP data to the persistent storage 116. Using the pointers in the write destage request 310, the DA 336 can obtain the old data and write destage context from the locked cache slots SM_1-N. Additionally, the write destage request 310 can provide the DA 336 access to the locked cache slots SM_1-N. Accordingly, the DA 336 can use the old data and write destage context to destage the WP data from GM 328 to the persistent storage 116. Furthermore, after the DA 336 destages the WP data, the DA 336 can notify the data services engine 340 that destaging of the WP data is complete. Accordingly, the data services engine 340 can clear and unlock the locked cache slots SM_1-N.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
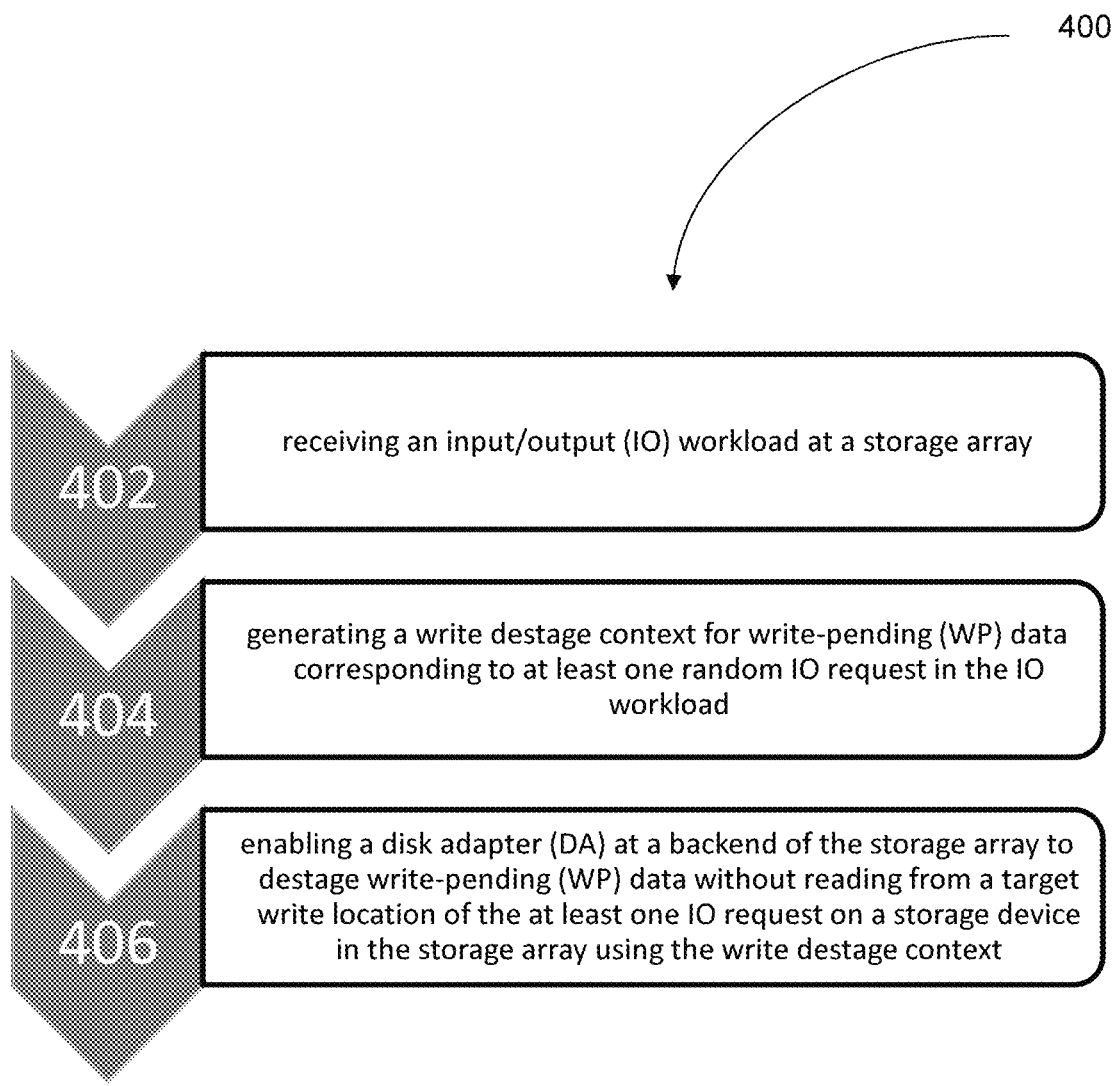
FIG. 4 is a flow diagram of a method for performant destaging of write pending (WP) data to disk per embodiments of the present disclosure.

Regarding FIG. 4, a method 400 relates to performant destaging of write pending (WP) data to disk. In embodiments, the controller 142 of FIG. 1 can perform all or a subset of operations corresponding to the method 400.

For example, the method 400, at 402, can include receiving an input/output (IO) workload at a storage array. The IO workload can include at least one IO request with a random write request. Further, at 404, the method 400 can include generating a write destage context for write-pending (WP) data corresponding to at least one random IO request. In addition, the method 400, at 406, can include enabling a disk adapter (DA) at a backend of the storage array to destage write-pending (WP) data without reading from the IO request's target write location on a storage device of the storage array using the write destage context.

Further, each operation can include any combination of techniques implemented by the embodiments described herein. Additionally, one or more of the storage array's components 108 can implement one or more of the operations of each method described above. Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data.

Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a backend component can also implement the above-described techniques. The backend component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an input/output (IO) workload at a storage array, wherein the IO workload includes at least one IO request and wherein the at least one IO request is a random write request;
generating a write destage context for write-pending (WP) data corresponding to the at least one random IO request using a data services engine of the storage array;
issuing a read request to a backend service engine to read a number of sectors from the storage device via the data services engine, wherein the sectors correspond to the target write location of the IO request, and the number corresponds to data alignment and XOR (exclusively-or) write requirements;
identifying gaps in the storage device sectors corresponding to the WP data via the data services engine; and
enabling a disk adapter (DA) at a backend of the storage array to destage write-pending (WP) data without reading from a target write location of the at least one IO request on a storage device in the storage array using the write destage context.

2. The method of claim 1, further comprising:
aligning the WP data to boundaries corresponding to the sectors via the data services engine; and
filling the identified gaps via the data services engine.

3. The method of claim 2, further comprising:
caching previously stored data corresponding to the target write location of the at least one IO request in memory shared between the data services engine and the DA.

4. The method of claim 3, further comprising:
generating a write destage context corresponding to the WP date via the data services engine;
including write destage metadata in the write destage context via the data services engine, wherein the write destage metadata includes information the DA uses to destage the WP data to the storage device; and
caching the write destage context in the memory via the data services engine.

5. The method of claim 4, further comprising:
locking cache slots of the memory storing the previously stored data and the write destage context via the data services engine.

6. The method of claim 5, further comprising:
sending a write destage request to the DA via the data services engine, wherein the write destage request includes a pointer to the locked cache slots.

7. The method of claim 6, further comprising:
accessing the previously stored data and the write destage context using the pointer via the DA;
destaging the WP data to the storage device using the previously stored data and the write destage context via the DA.

8. The method of claim 7, further comprising:
unlocking the locked cache slots in response to the data services engine receiving a write completion response from the DA.

9. A system with a processor and memory, the system configured to:
receive an input/output (IO) workload at a storage array, wherein the IO workload includes at least one IO request and wherein the at least one IO request is a random write request;
generate a write destage context for write-pending (WP) data corresponding to the at least one random IO request using a data services engine of the storage array;
issue a read request to a backend service engine to read a number of sectors from the storage device via the data services engine, wherein the sectors correspond to the target write location of the IO request, and the number corresponds to data alignment and XOR (exclusively-or) write requirements;
identify gaps in the storage device sectors corresponding to the WP data via the data services engine; and
enable a disk adapter (DA) at a backend of the storage array to destage write-pending (WP) data without reading from a target write location of the at least one IO request on a storage device on the storage array using the write destage context.

10. The system of claim 9, further configured to:
align the WP data to boundaries corresponding to the sectors via the data services engine; and
fill the identified gaps via the data services engine.

11. The system of claim 10, further configured to:
cache previously stored data corresponding to the target write location of the at least one IO request in memory shared between the data services engine and the DA.

12. The system of claim 11, further configured to:
generate a write destage context corresponding to the WP date via the data services engine;
include write destage metadata in the write destage context via the data services engine, wherein the write destage metadata includes information the DA uses to destage the WP data to the storage device; and
cache the write destage context in the memory via the data services engine.

13. The system of claim 12, further configured to:
lock cache slots of the memory storing the previously stored data and the write destage context via the data services engine.

14. The system of claim 13, further configured to:
send a write destage request to the DA via the data services engine, wherein the write destage request includes a pointer to the locked cache slots.

15. The system of claim 14, further configured to:
access the previously stored data and the write destage context using the pointer via the DA;
destage the WP data to the storage device using the previously stored data and the write destage context via the DA.

16. The system of claim 15, further configured to:
unlock the locked cache slots in response to the data services engine receiving a write completion response from the DA.

* * * * *